(12) United States Patent
Shibagami

(10) Patent No.: US 9,300,867 B2
(45) Date of Patent: Mar. 29, 2016

(54) IMAGING APPARATUS, ITS CONTROL METHOD, AND STORAGE MEDIUM

(71) Applicant: CANON KABUSHIKI KAISHA, Tokyo (JP)

(72) Inventor: Genjiro Shibagami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/463,722

(22) Filed: Aug. 20, 2014

(65) Prior Publication Data

US 2015/0054978 A1 Feb. 26, 2015

(30) Foreign Application Priority Data

Aug. 21, 2013 (JP) ................. 2013-171255

(51) Int. Cl.
| | |
|---|---|
| *H04N 5/232* | (2006.01) |
| *G03B 13/34* | (2006.01) |
| *G02B 7/36* | (2006.01) |
| *G06T 7/00* | (2006.01) |
| *G03B 13/36* | (2006.01) |

(52) U.S. Cl.
CPC ............ *H04N 5/23229* (2013.01); *G02B 7/365* (2013.01); *G06T 7/0083* (2013.01); *H04N 5/23212* (2013.01); *G03B 13/36* (2013.01); *G03B 2217/18* (2013.01); *G06T 2207/10024* (2013.01); *G06T 2207/20144* (2013.01); *G06T 2207/30201* (2013.01)

(58) Field of Classification Search
CPC ............... G02B 7/365; H04N 5/23212; H04N 5/23229; G03B 13/36
USPC ........................................ 348/222.1; 396/121
See application file for complete search history.

(56) References Cited

U.S. PATENT DOCUMENTS

2009/0096897 A1* 4/2009 Saito .......................... 348/241

FOREIGN PATENT DOCUMENTS

JP 2007-124398 A 5/2007

\* cited by examiner

*Primary Examiner* — Rochelle-Ann J Blackman
(74) *Attorney, Agent, or Firm* — Fitzpatrick, Cella, Harper & Scinto

(57) ABSTRACT

An imaging apparatus is arranged to perform a focus detection in each of focus detection areas set on an image pickup plane; select first area and second areas from among the focus detection areas on the basis of the focus detection result; pick up an optical image which is formed at each of a first focus position at which the selected first area is in focus and a second focus position at which the selected second area is in focus and generate image data; determine an area to be processed on the basis of the image data; execute a predetermined processing to the image data on the basis of a determination result. The second area is selected based on the number of focus detection areas satisfying a predetermined condition from among the focus detection areas each having a depth difference from the first area in a predetermined range.

12 Claims, 8 Drawing Sheets

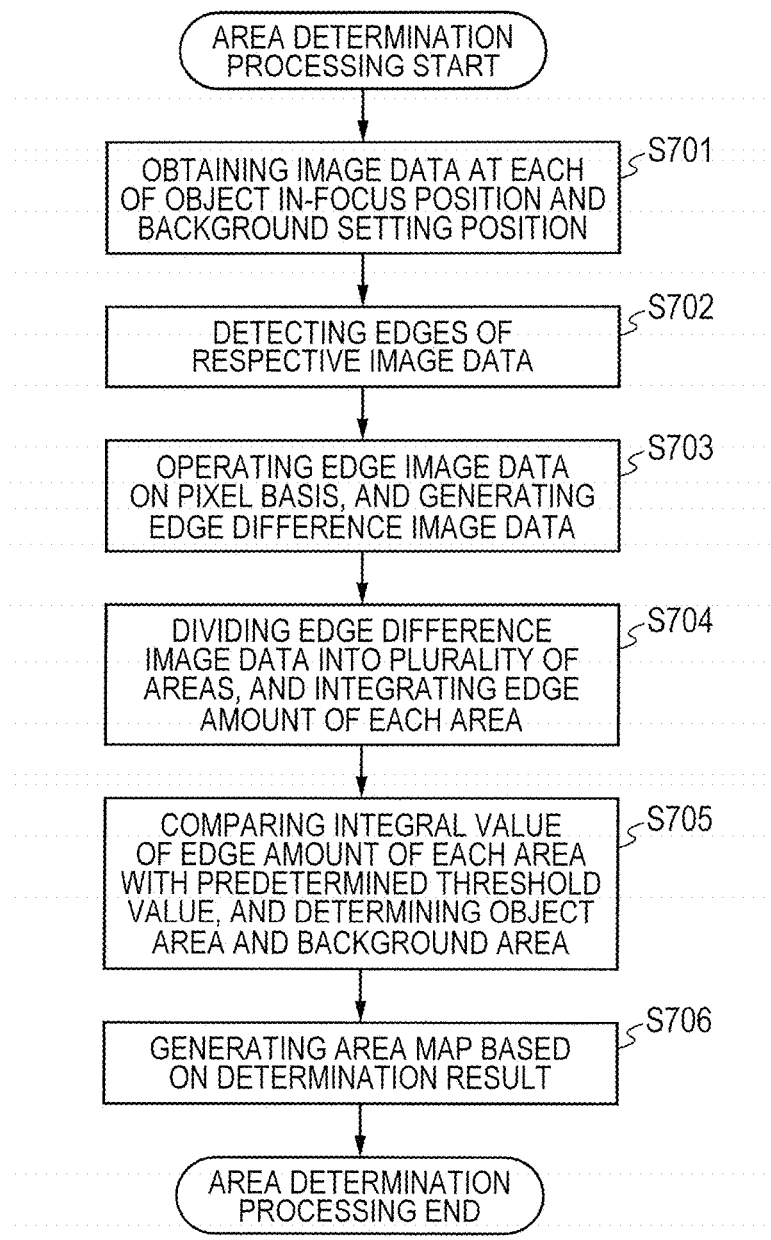

IMAGING APPARATUS, ITS CONTROL METHOD, AND STORAGE MEDIUM

BACKGROUND OF THE INVENTION

1. Field of the Invention

The present invention relates to an imaging apparatus for picking up, recording, and displaying a still image or a moving image and to a control method of the imaging apparatus.

2. Description of the Related Art

In recent years, functions for executing an image processing to areas other than an object is installed in many imaging apparatuses such as digital camera, digital video camera, and the like. For example, as one of those functions, there is a function of artificially providing a shading effect to a background area of photographed image data, or the like. Generally, in the case of an imaging apparatus such as a single lens reflex camera in which an imaging element is of a large size, by opening an iris so as to increase a focal length, a depth of field becomes shallow and it is relatively easy to photograph an image so that the background other than the object which is in focus is blurred as mentioned above. On the other hand, in an imaging apparatus in which an imaging element is of a small size such as a compact digital camera or the like, even if the foregoing method is used, since there is a tendency that the depth of field becomes deep, it is difficult to photograph image data in which a background is blurred.

There is known such a technique that in consideration of the foregoing problem, by discriminating an object area and a background area of the photographed image data and executing a filtering processing to the background area, even in the imaging apparatus in which the imaging element is of a small size such as a compact digital camera or the like, the image data in which the background is shaded can be obtained. Japanese Patent Application Laid-Open No. 2007-124398 discloses such a technique that a spatial frequency component is obtained from the photographed image data in order to discriminate an object area and a background area. That is, according to the technique disclosed in Japanese Patent Application Laid-Open No. 2007-124398, a position of a focus lens is adjusted so that the object is located at a distant end of the depth of field, thereby increasing a blur amount on the background side in the photographed image data. A spatial frequency component amount of each of a plurality of divided blocks is calculated and the block is determined as an object area on the basis of whether or not such a value is equal to or greater than a threshold value.

However, according to the technique disclosed in Japanese Patent Application Laid-Open No. 2007-124398, since the area discrimination is performed based on the spatial frequency component amounts of the image data of one image, there is such a problem that when the blur amount on the background area side is small, an enough precision is not obtained. Particularly, in the imaging apparatus in which the imaging element is small such as a compact digital camera which is widespread in recent years, since there is such a tendency that even if the foregoing processing is executed, an enough blur amount is not obtained, it is difficult to perform the area discrimination based on the spatial frequency component amounts of the image data of one frame.

SUMMARY OF THE INVENTION

The invention is made in consideration of the foregoing problems and it is an aspect of the invention to provide an imaging apparatus having such a function that an area serving as a background (or foreground) in an image can be correctly determined and an area including an object and a background area (or foreground area) can be accurately determined.

To accomplish the above aspect of the invention, according to the invention, an imaging apparatus comprises: a focus detection unit configured to set a plurality of focus detection areas on an image pickup plane and perform a focus detection in each of the focus detection areas; a selection unit configured to select a first area and a second area from among the plurality of focus detection areas on the basis of a result of the focus detection; an imaging unit configured to pick up an optical image which is formed by a photographing optical system at each of a first focus position at which the selected first area is in focus and a second focus position at which the selected second area is in focus and generate image data; a determination unit configured to determine an area to be processed, on the basis of the image data; and a processing unit configured to execute a predetermined processing to the image data on the basis of a result of the determination, wherein the selection unit selects the second area on the basis of the number of focus detection areas in which the focus detection result satisfies a predetermined condition, from among the focus detection areas each having a depth difference from the first area in a predetermined range.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a diagram illustrating a flowchart for the area determination processing operation of the imaging apparatus.

DESCRIPTION OF THE EMBODIMENTS

Various exemplary embodiments, features, and aspects of the present invention will be described in detail below with reference to the drawings.

Imaging Apparatus

An imaging apparatus according to the embodiment will be described with reference to FIGS. 1 to 3.

Figure 1:
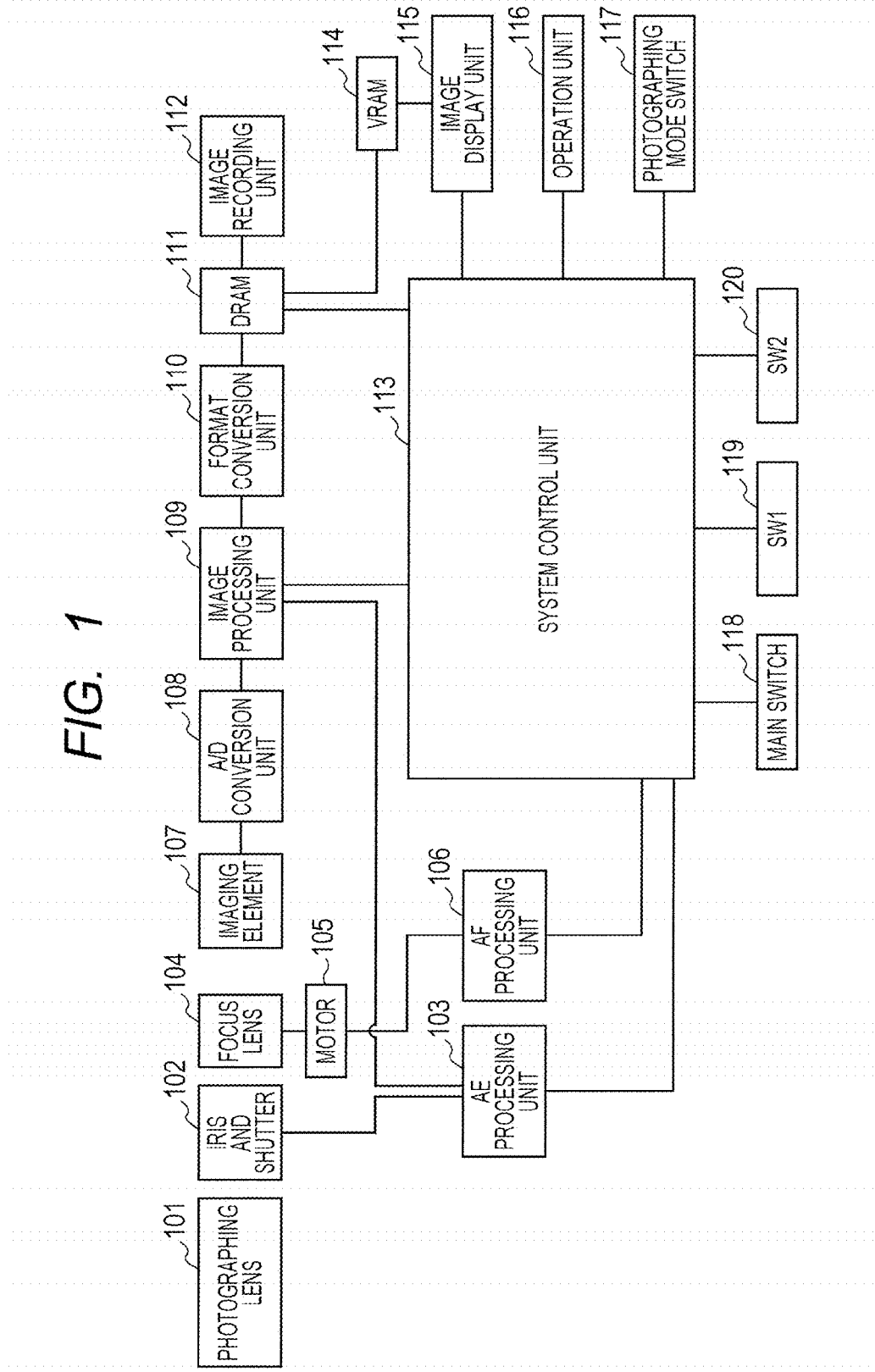
FIG. 1 is a constructional diagram of an imaging apparatus.

FIG. 1 is a block diagram illustrating a construction of the imaging apparatus such as digital camera, portable telephone, or the like to which the embodiment of the invention is applied. In the diagram, there are illustrated: a photographing lens 101 including a zooming mechanism; an iris and shutter 102 for controlling a light amount; an AE processing unit 103; a focus lens 104 for adjusting a focal point onto an imaging element, which will be described hereinafter; a motor 105 for driving the focus lens; and an AF processing unit 106. The component elements 101, 102, and 104 construct a photographing optical system for forming an optical image of an object. An imaging element 107 converts the optical image of the object formed by the photographing optical system into an electric signal. An A/D conversion unit 108 includes a CDS unit for eliminating output noises of the imaging element 107 and a non-linear amplification unit for performing a non-linear amplification before an A/D conversion. An image processing unit 109 processes the image data which is output from the A/D conversion unit 108. A format conversion unit 110 and a high-speed built-in memory 111 (for example, random access memory or the like; hereinbelow, referred to as a DRAM) are provided. An image recording unit 112 is constructed by a recording medium such as a memory card or the like and its interface. A system control unit (hereinbelow, referred to as a CPU) 113 controls system operation such as a photographing sequence or the like. The CPU 113 loads and executes a program stored in a memory (not shown), thereby controlling each unit of the imaging apparatus.

Further, a memory 114 for image display (hereinbelow, referred to as a VRAM) is provided. An image display unit 115 performs a display for operation assistance, a display of a camera state, and a display of the photographing screen and the focus detection area at the time of photographing besides an image display. An operation unit 116 is provided to operate the camera from the outside. A photographing mode switch 117 is provided to select a photographing mode such as macro mode, distant view mode, sports mode, or the like. A main switch 118 is provided to turn on a power source to the system. A switch (hereinbelow, referred to as an SW1) 119 is provided to issue a first instruction to execute the photographing standby operation such as AF, AE, and the like. Further, a photographing switch (hereinbelow, referred to as an SW2) 120 is provided to issue a second instruction to execute the photographing after the operation of SW1.

The DRAM 111 mentioned above is used as a high-speed buffer for temporarily storing an image, a work memory for compression and expansion of the image, or the like. The operation unit 116 includes, for example, the following operation elements: that is, a menu switch to make various kinds of settings such as setting of photographing function of the imaging apparatus, setting for image reproduction, and the like; a zoom lever to instruct the zooming operation of the photographing lens; an operation mode change-over switch to switch a photographing mode and a reproducing mode; and the like. The photographing mode switch 117 changes a focus detection distance range, an AF operation, and the like in accordance with the photographing mode selected by the user.

The image processing unit 109 has a data processing function for performing an area determination using edge components, a detection of an object area (for example, a human face or the like) in which a focus should be adjusted, and the like by using the image data. An area determination unit to make the area determination will be described hereinafter with reference to FIGS. 2 and 3.

The AF processing unit 106 can calculate an AF evaluation value from a contrast of the image. When the contrast is high, the AF evaluation value is large. When the contrast is low, the AF evaluation value is small.

A construction of the image processing unit 109 having an area determination unit according to the present embodiment will be described with reference to FIG. 2. FIG. 2 is a diagram illustrating the construction of the image processing unit 109 having an area determination unit according to the present embodiment. Such a construction may be constructed as a program which is executed by the CPU 113 or a part of it may be constructed by hardware.

Figure 2:
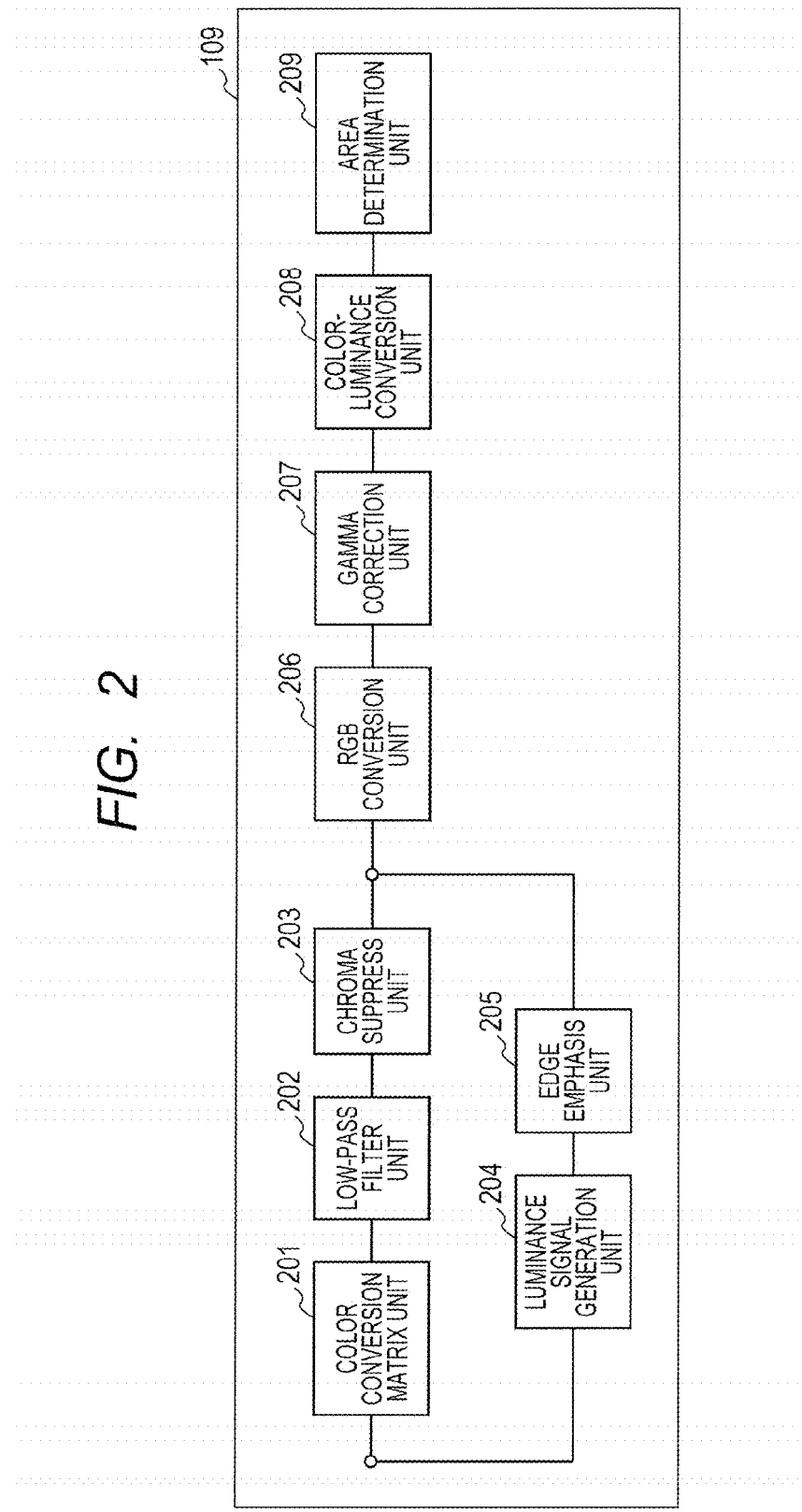
FIG. 2 is a block diagram of an image processing unit of the imaging apparatus.

In FIG. 2, a color conversion matrix unit 201 applies a color gain to the photographed image data, thereby converting the image data into color difference signals R-Y and B-Y so that the image is reproduced in optimum color. A low-pass filter (LPF) unit 202 executes a filter processing to limit bands of the color difference signals R-Y and B-Y. A chroma suppress (CSUP) unit 203 executes a data processing to suppress a false color signal of a saturation portion in the image data which is band-limited by the LPF unit 202. The photographed image data is also output to a luminance signal generation unit 204. The luminance signal generation unit 204 generates a luminance signal Y from the image data which is input. An edge emphasis unit 205 executes an edge emphasis processing to the generated luminance signal Y.

An RGB conversion unit 206 converts the color difference signals R-Y and B-Y which are output from the CSUP unit 203 and the luminance signal Y which is output from the edge emphasis unit 205 into RGB signals. A gamma correction unit 207 performs a gradation correction to the converted RGB signals. After that, a color-luminance correction unit 208 converts the gradation-corrected RGB signals into YUV signals.

An area determination unit 209 performs a determination about an object area and a background area to the image data converted into the YUV signals. A detailed construction of the area determination unit 209 will be described in detail hereinafter with reference to FIG. 3.

Figure 3:
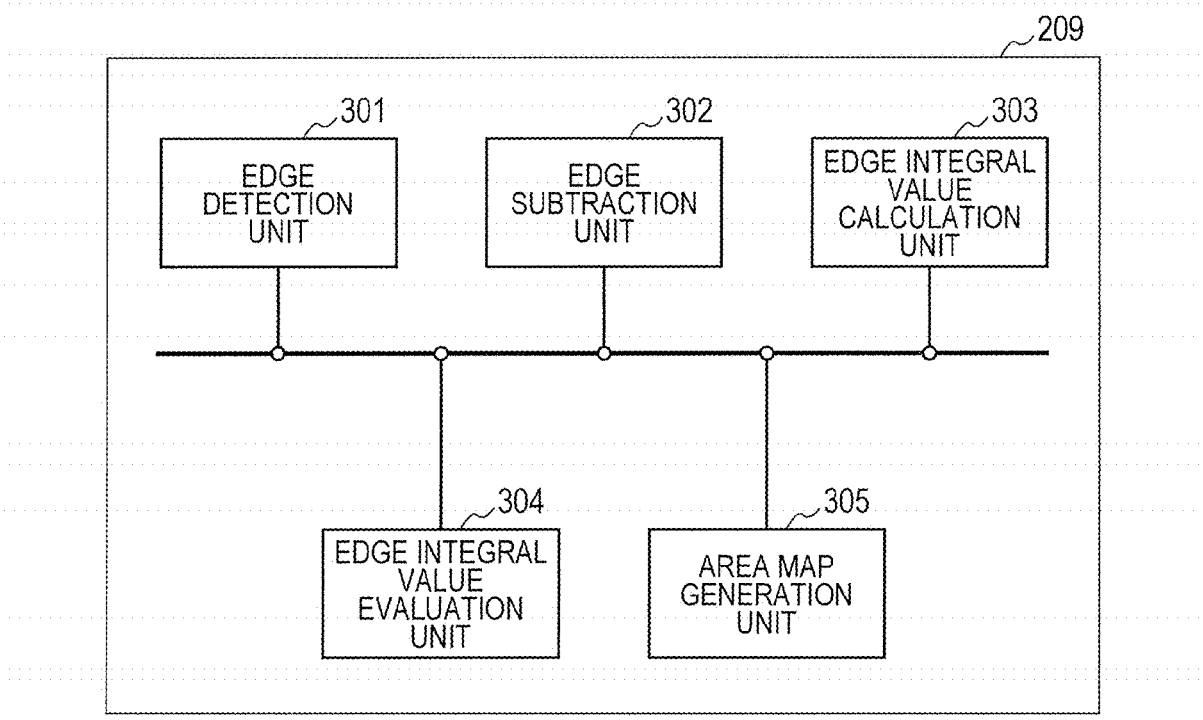
FIG. 3 is a block diagram of an area determination unit of the imaging apparatus.

FIG. 3 illustrates an example of the construction of the area determination unit 209. As illustrated in the diagram, the area determination unit 209 has an edge detection unit 301, an edge subtraction unit 302, an edge integral value calculation unit 303, an edge integral value evaluation unit 304, and an area map generation unit 305.

Background Shading Mode Processing

Figure 4:
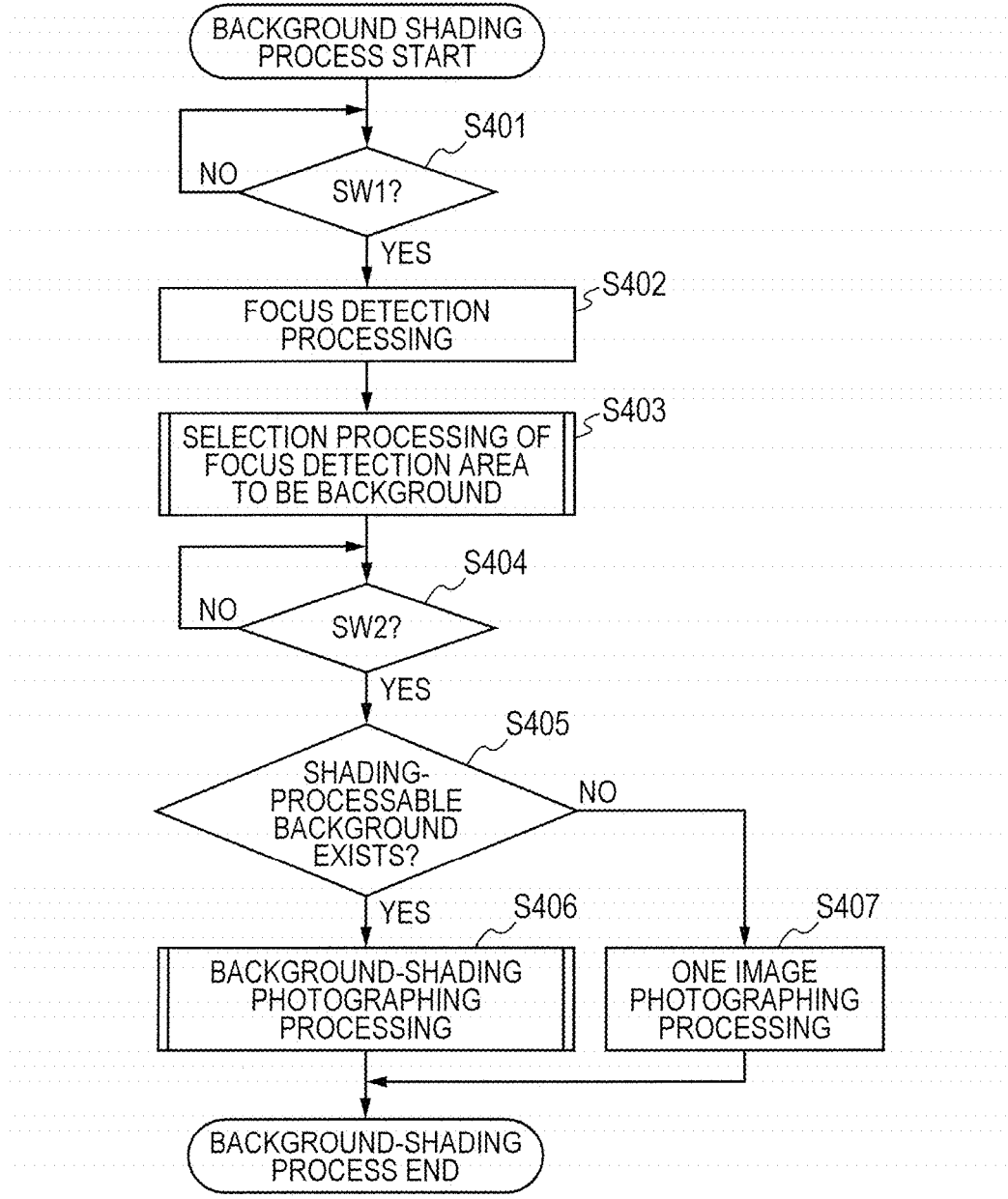
FIG. 4 is a diagram illustrating a flowchart for the image pickup operation in a background shading mode of the imaging apparatus.

The background-shading photographing operation in the imaging apparatus according to the present embodiment will now be described with reference to FIG. 4. This operation is a processing operation which is executed when the switches SW1 and SW2 are turned on in the case where, for example, a background shading mode is set to the imaging apparatus by a menu switch or the like. The operation of the imaging apparatus is accomplished by a method whereby the CPU 113 controls the image processing unit 109 and other portions related thereto in accordance with necessity by executing a program. First, in S401, the CPU 113 discriminates whether or not the switch SW1 is depressed. If it is determined in S401 that the switch SW1 is depressed, the CPU 113 controls the AF processing unit 106 and executes a focus detection processing in S402. In the focus detection processing, the CPU 113 arranges the preset focus detection areas onto the image pickup plane and executes the focus detecting operation with respect to each focus detection area. In the present embodiment, it is assumed that the focus detection areas which are arranged on the image pickup plane are 30 areas arranged in a lattice pattern of (5 rows×6 columns) illustrated in FIGS. 8A and 8B.

After completion of the focus detection processing, in S403, the CPU 113 controls the image processing unit 109 and executes a selection processing of the focus detection area serving as a background on the basis of a result of the focus detecting operation in S402. The selection processing of the focus detection area serving as a background will be described hereinafter with reference to FIG. 5.

Subsequently, in S404, the CPU 113 determinates whether or not the switch SW2 is depressed. If it is determined that the switch SW2 is depressed, the photographing is performed. The specific operation (operation in S405 and subsequent steps) of the photographing will be described hereinafter. If it Is determined that the switch SW2 is not depressed, the processing routine is returned to S404 and the determination about whether or not the switch SW2 is depressed is repeated.

If it is determined that the switch SW2 is depressed, in S405, the CPU 113 discriminates whether or not there is a shading-processable background area where the shading processing (predetermined processing) can be executed. This determination is made in accordance with the setting contents of a background selection flag, which will be described hereinafter. If it is determined that the shading-processable background area exists, the background-shading photographing processing is executed in S406, and the background-shading processing is completed. The background-shading photographing processing will be described hereinafter with reference to FIG. 7. If it is determined that the shading-processable background area does not exist, one image photographing processing, that is, a normal photographing processing (S407) is executed and the background-shading processing is completed.

Background Selection Processing

Subsequently, the background selection processing operation according to the embodiment will be described with reference to FIG. 5.

Figure 8A:
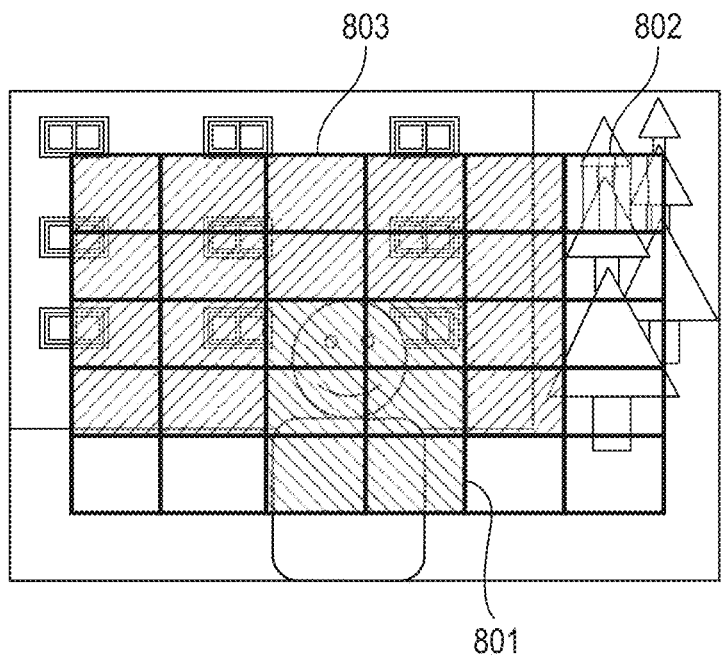
FIGS. 8A and 8B are diagrams each illustrating a focus detection area which is set in the background shading mode of the imaging apparatus.

First, in S501, a focus detection area serving as an object area is selected from among the 30 focus detection areas of (5 rows×6 columns) set in the image pickup plane in S501. In the present embodiment, it is assumed that a hatched area 801 in FIG. 8A is a focus detection area selected as an object area. Although an example of a selecting method of the focus detection area which is selected as an object area will be described hereinbelow, it is not limited to such a method.

When an object such as a human face or the like is not detected by the image processing unit 109, the focus detection area serving as an object area is selected from the focus detection areas arranged near the center of the image pickup plane. For example, when the 30 focus detection areas of (5 rows×6 columns) are set in the image pickup plane, the focus detection area serving as an object area is selected as follows on the basis of a focus detection result of the focus detection areas of (3 rows×4 columns) arranged near the center of the image pickup plane among the focus detection areas of (5 rows×6 columns).

Whether or not there is an adjacent focus detection area in which the focus detection result lies in a range of a predetermined depth (fifth predetermined depth) is sequentially discriminated for the focus detection areas in an order of, first, the focus detection area which is in focus and has a focus detection result of the nearest focus position of the shortest distance, next, the focus detection area which is in-focus and has a focus detection result of the near focus position; and the like. Thus, if there is the adjacent focus detection area in the predetermined depth range, the focus detection result of such a focus detection area and the focus detection area in the range of the fifth predetermined depth are selected as an object area and its focus detection result. In the present embodiment, it is assumed that the fifth predetermined depth is 1 depth.

On the other hand, when the object is detected by the image processing unit 109, in the focus detection area which overlaps with the detected object area, the adjacent focus detection area which is in focus and in which the focus detection result lies in a range of a fourth predetermined depth is selected as an object area. As a focus detection result of this object area, it is assumed that the focus detection result of the nearest focus position among the focus detection results of the selected focus detection areas is used. Also in this case, in the present embodiment, it is assumed that the fourth predetermined depth is 1 depth.

Although both of the fourth predetermined depth and the fifth predetermined depth are set to 1 depth in the present embodiment, naturally, they may be set to a different depth.

As another selecting method in the case where the object is detected, it is possible to use a method whereby the focus detection area is arranged in the detected object area, the focus detection is performed, and the focus detection area serving as a focus detection result in a range of a third predetermined depth is selected. As a focus detection result of the object area in this case as well, the focus detection result of the nearest focus position may be used from among the selected focus detection areas.

Subsequently, in S502, the CPU 113 discriminates whether or not the focus detection area serving as an object could be selected in S501. If it is determined that there is no object area, a background selection flag is cleared in S516 and the processing is completed. The background selection flag is a flag indicating that candidates of a background area could be selected. If the object area is not selected, since the background area having a depth difference of a predetermined range cannot be selected from the object, the background selection flag is cleared in S516.

Subsequently, in S503, the focus detection area serving as a background candidate area is selected. In the present embodiment, "focus detection area serving as a background candidate area" denotes a focus detection area having a reliable focus detection result and is a focus detection area having a focus detection result in a range of a predetermined depth difference as compared with the focus detection result of the object area. "in a range of a predetermined depth difference" denotes that the focus detection result lies in a range where the focus is adjusted on the infinite side than the focus detection result of the object area and the depth difference is larger than the first depth difference and is smaller than the second depth difference.

When the depth difference between the focus detection area serving as a background candidate area and the focus detection area of the object area is smaller than the first depth difference, even if the object is photographed at a focus lens position (focus position) at which the object is in focus, the background area is also in focus. Therefore, the object and the background area cannot be separated by referring to a difference between the edge components of the image. In the case where a depth difference between the focus detection area serving as a background candidate area and the focus detection area of the object area is larger than the second depth difference, when the object is photographed at a focus lens position at which the object is in focus, an area which is already optically sufficiently shaded is obtained. For those reasons, the focus detection area in the range of the predetermined depth difference is selected as a background area. In the present embodiment, it is assumed that the first depth difference as a lower limit depth difference of the range of the predetermined depth difference is set to 5 depth, and the second depth difference as an upper limit depth difference is set to 20 depth.

Subsequently, in S504, the CPU 113 discriminates whether or not the background candidate area could be selected in S503. If it is determined that there is no focus detection area serving as a background candidate area, the background selection flag is cleared in S516 and the processing is completed. If it is determined that there is the focus detection area serving as a background candidate area, then in S505, a focus detection result of the most distant (infinite side) focus position among the focus detection results of the focus detection areas of the background candidate areas is set to first comparison reference data.

Subsequently, in S506, a focus detection result of the next distant focus position of the set comparison reference data is set as comparison subject data. Subsequently, in S507, whether or not the comparison reference data and the comparison subject data lie in the range of the first predetermined depth is discriminated. In the present embodiment, the first predetermined depth is set to 1 depth.

Such a comparison is performed to the in-focus focus detection results of all of the background candidate areas. The comparison is performed in order from data of the infinite side focus position toward data of the near side focus position. Since the comparison is performed from the infinite side toward the near side, the comparison subject data of the final comparison becomes a focus detection result of the nearest side focus position among the background candidate areas.

If the comparison reference data and the comparison subject data lie in the range of 1 depth an in-depth counter is counted up in S503. It is assumed that "in-depth counter" Is applied to the comparison reference data. The in-depth counter is a counter to count the number of focus detection ranges having the focus detection results in the range of the same depth as that of the comparison reference data. The larger the count number is, the larger the number of focus detection ranges having the focus detection results in the range of the same depth as that of the comparison reference data is. In other words, a focus is adjusted according to the focus detection result of that comparison reference data, so that an in-focus state is attained in a large area of the image pickup plane.

Subsequently, in S509, whether or not the comparison subject data is the final data of the background candidate area is confirmed. If it is determined that the comparison subject data is the final data, then in S510, a background candidate selection processing to select candidates of the background area from the focus detection areas at which a predetermined condition is satisfied on the basis of the count value of the in-depth counter which is counted up in S508 is executed. The background candidate selection processing will be described hereinafter with reference to FIG. 6. If it is determined that the comparison subject data is not the final data, the processing routine is returned to S506 and a focus detection result of the near focus position subsequent to the comparison subject data used in S507 when viewing from the imaging apparatus is set as comparison subject data.

In S507, if the comparison reference data and the comparison subject data do not lie in the range of 1 depth the background candidate selection processing is executed in S511. The background candidate selection processing will be described hereinafter with reference to FIG. 6.

Subsequently, in S512, whether or not the comparison subject data is the final data is discriminated. If it is determined that the comparison subject data is not the final data, subsequently, in S513, the comparison subject data is set as comparison reference data. After that, the processing routine is returned to S506. Subsequently, a focus detection result of the near focus position subsequent to the comparison subject data used in S507 when viewing from the imaging apparatus is set as comparison subject data.

If it is determined that the comparison subject data is the final data whether or not the background candidate is set is discriminated in S514. "background candidate" denotes a focus detection area serving as a background which is set by the background candidate selection processing. If it is determined that the background candidate is set the background selection flag is set in S515. If it is determined that the background candidate is not set the background selection flag is cleared in S516.

If the background selection flag is set, it is determined that the shading-processable background area exists, and the background-shading photographing processing is executed. If the background selection flag is cleared, it is determined that the shading-processable background area does not exist, and the one-image photographing is executed.

Since only one background image is photographed in the present embodiment, an area in which the count value of the in-depth counter is maximum is selected as a background candidate 1. However, in the case of photographing a plurality of background images, since it is necessary to set a plurality of background candidates, it is sufficient to select a plurality of background images from an upper-order image in the in-depth counter and set the selected images as a background candidate 1.

Background Candidate Selection Processing

Figure 6:
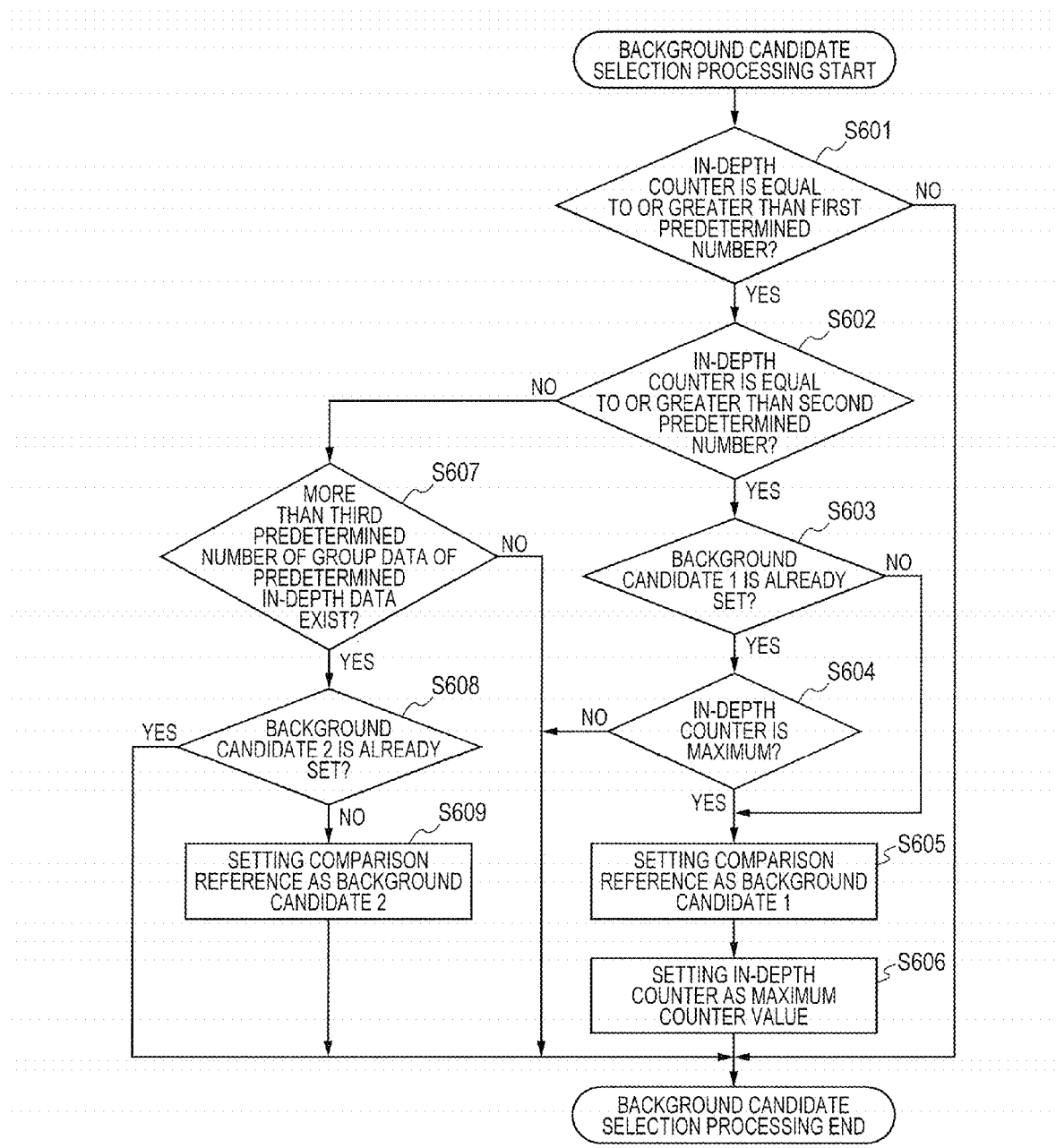
FIG. 6 is a diagram illustrating a flowchart for the background candidate selecting operation of the imaging apparatus.

Subsequently, the background candidate selection processing will be described with reference to FIGS. 6, 8A and 8B.

First, in S601, whether or not the count value of the in-depth counter mentioned above is equal to or greater than a first predetermined number is discriminated. If it is determined that the count value of the in-depth counter mentioned above is equal to or greater than the first predetermined number whether or not the count value of the in-depth counter is equal to or greater than a second predetermined number is discriminated in S602. If it is determined that the count value of the in-depth counter is equal to or greater than the second predetermined number whether or not the first background candidate is already set is discriminated in S603. In the present embodiment, the first predetermined number is set to a numerical value smaller than the second predetermined number, the first predetermined number is set to 3, and the second predetermined number is set to 6.

If it is determined that the first background candidate is already set, then in S604, whether or not the count value of the in-depth counter is equal to the maximum one of the count values of the in-depth counter which are used for comparison so far is discriminated by comparing the count value of the in-depth counter with the maximum count value.

If it is determined that the count value of the in-depth counter is equal to the maximum value, the focus detection area of the focus detection result serving as comparison reference data mentioned above is set to the first background candidate in S605. In S606, the count value of the in-depth counter is set as a maximum count value.

If it is determined that the first background candidate is not set, then in S605, the focus detection area of the focus detection result serving as comparison reference data mentioned above is set to the first candidate of the background candidate and the count value of the in-depth counter is set as a maximum count value.

It is assumed that the area in which the focus can be adjusted by the focus detection result of the first background candidate is an area shown at 803 in FIG. 8A in the present embodiment. As mentioned above, a background area in which the focus can be adjusted to the widest area in the image pickup plane can be selected. Since the background candidate is selected so that the focus can be adjusted to the widest area in the image pickup plane, even in a focus detection area (802) having the focus detection result of the most distant focus position in the image, it is not to be selected since the range which occupies in the image pickup plane is narrow.

If it is determined in S601 that the count value of the in-depth counter is smaller than the first predetermined number, the background candidate selection processing is finished. If it is determined in S602 that the count value of the in-depth counter is smaller than the second predetermined number, whether or not group data of the number which is equal to or greater than a third predetermined number in the second predetermined in-depth data exists is discriminated in S607. In the present embodiment, the second predetermined depth is set to 1 and the third predetermined number is set to 2.

Figure 5:
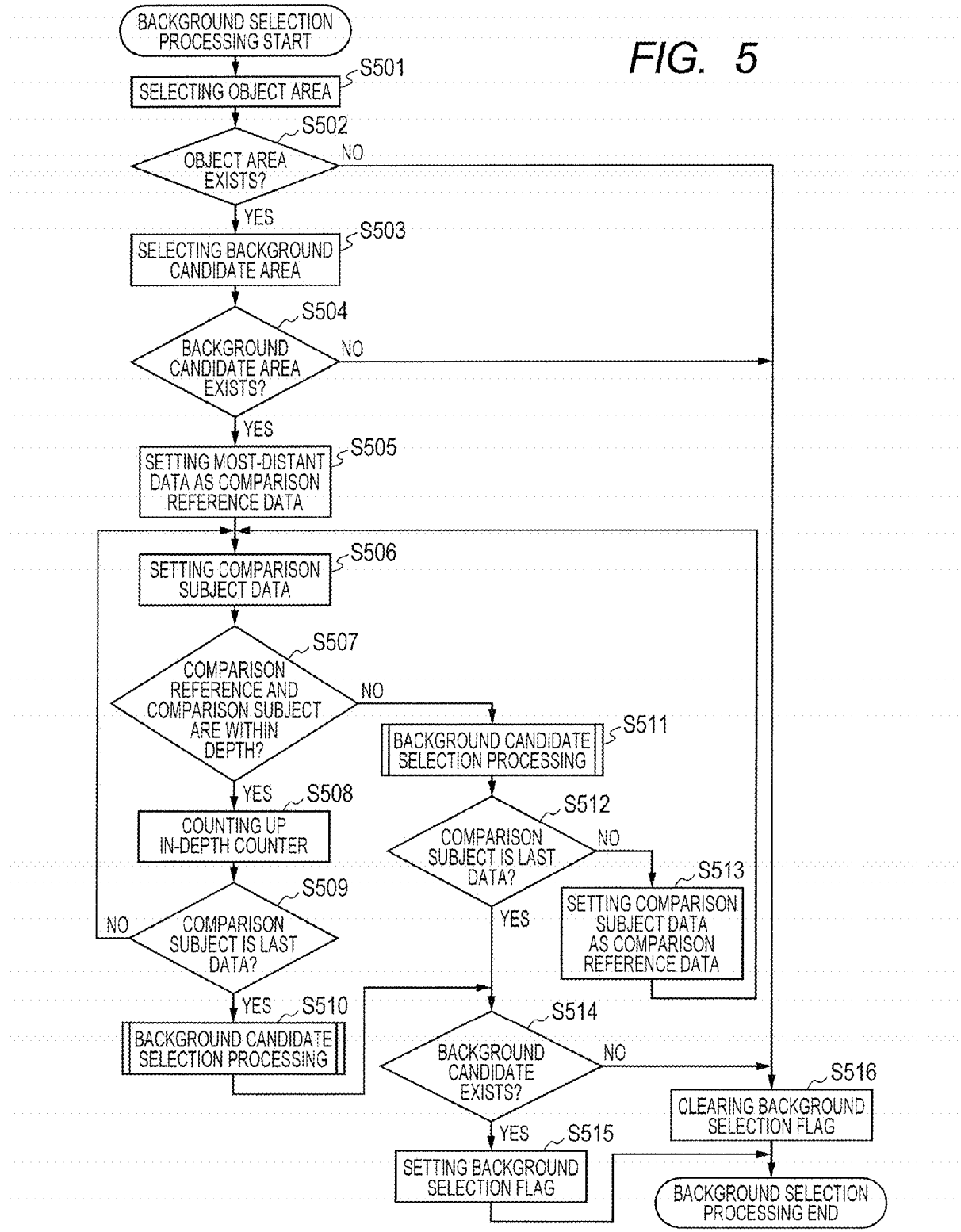
FIG. 5 is a diagram illustrating a flowchart for the background selection processing operation of the imaging apparatus.

It is now assumed that "predetermined in-depth data" denotes a focus detection area having the focus detection result which is determined that it lies in the range of the predetermined depth in the discrimination step about whether or not the focus detection result lies within the predetermined depth with respect to the focus detection results in a range from the focus detection result of the infinite side focus position to the focus detection result of the near side focus position in the background selection processing described with reference to FIG. 5. "group data" denotes focus detection areas which are determined to be mutually adjacent among the focus detection areas of the data in the range of the predetermined depth. By discriminating whether or not the data is the group data, such a situation that the only one focus detection area having the focus detection result of the infinite side focus position is selected as a background due to a result of an erroneous focus detection can be prevented.

If it is determined that the group data of the number which is equal to or greater than the third predetermined number in the data in the range of the second predetermined depth exists, whether or not a second candidate of the background area is already set is discriminated in S608. If it is determined that the second candidate of the background area is already set, the background candidate selection processing is completed. If it is determined that the second candidate of the background area is not set the focus detection area of the focus detection result serving as comparison reference data is set as a second candidate of the background area in S609.

In this manner, the discrimination is sequentially made from the data of the infinite side focus position and, if the second background candidate is set, a resetting (updating) of the second background candidate is not performed. Thus, even in the case where a distance to the object area decreases because the first background candidate is reset, the focus detection area in the range of the predetermined depth in which the focus is adjusted to the more distant position can be selected.

Figure 8B:
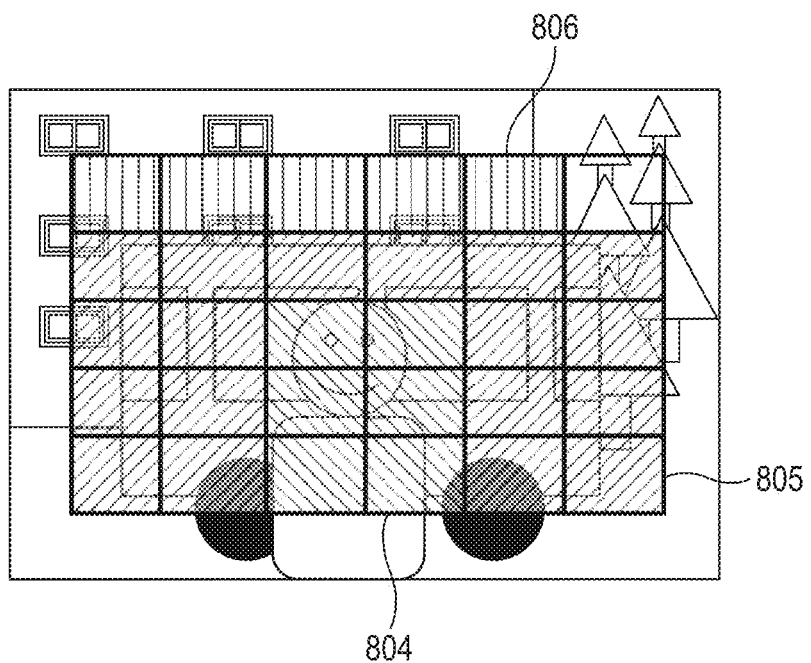

In the area setting example illustrated in FIG. 8B, the area in which the focus can be adjusted as a second background candidate denotes an area shown with a reference of 806. When a distance between an area (first background candidate) shown at 805 in which the focus can be adjusted to the widest area in the image pickup plane and an object area shown with a reference of 804 is small, an area map cannot be correctly formed by edge components of the image data. In such a case, the second background candidate is selected as a background candidate of the distant focus position in the image pickup plane and in which its focus detection result is reliable. Information of such a selection can be provided for, for example, the background selection flag (a plurality of bits) which is set in S515. Consequently, in the discrimination about the presence or absence of the shading-processable background area in S405, the first or second background candidate can be selected.

If it is determined in S607 that the group data of the number which is equal to or greater than the third predetermined number of the second predetermined depth does not exist, the background candidate selection processing is completed.

Background-Shading Photographing Processing

Subsequently, the operation of an area determination processing of the Imaging apparatus will be described with reference to FIGS. 4 and 7.

FIG. 7 is a diagram illustrating a flowchart for the area determination processing operation in the background-shading photographing processing.

First, in S701, the CPU 113 controls each unit of the imaging apparatus and performs the photographing in accordance with each of a focus lens position based on the focus detection result of the focus detection area serving as an object area and a focus lens position based on the focus detection result of the focus detection area serving as a background.

In S702, the edge detection unit 301 executes a band-pass filtering processing to the image data which is obtained in S701 and in which a focus is adjusted onto the object side and the image data which is obtained in S701 and in which a focus is adjusted onto the background side. Subsequently, absolute values of results of the band-pass filtering processing are calculated and an edge of each image data is obtained.

In S703, the edge subtraction unit 302 subtracts, every pixel, the edge of the image data in which the focus is adjusted onto the background side from the edge information of the image data in which the focus is adjusted onto the object side and generates image data in which a difference between the edges is eliminated (hereinbelow, referred to as edge difference image data). In S704, the edge integral value calculation unit 303 divides the edge difference image data generated in S703 into a plurality of areas and integrates an edge amount of each area.

In S705, the edge integral value evaluation unit 304 compares an integral value of the edge amount of each area calculated in S704 with a predetermined threshold value. When the integral value of the edge amount is equal to or greater than the predetermined threshold value, the edge Integral value evaluation unit 304 determines that such an area is an object area. When the integral value of the edge amount is less than the predetermined threshold value, the edge integral value evaluation unit 304 determines that such an area is a background area. The predetermined threshold value may be a predetermined fixed value or may be adaptively obtained from histogram distribution of the edges of the image data.

In S706, on the basis of a determination result in S705, the area map generation unit 305 generates an area map by which the object area and the background area can be distinguished. In the above area map, for example, a composition ratio is expressed by a pixel value of the image data itself. For the area map, a low-pass filter may be applied at a boundary between the object area and the background area in order to visually suppress appearance of step at such a boundary.

Subsequently, a shading processing of the background area in the embodiment will be described. The image processing unit 109 executes a special filtering processing to the photographed image data and generates blurred image data IMG2. The image data serving as a subject to which the special filtering processing is executed is the image data photographed in S701. In the special filtering processing, the filtering processing is executed to the photographed image data on the basis of a designated filter shape. In the filtering processing, a gain value K which is arbitrarily set is multiplied to the pixel having a predetermined luminance value and an interpolation of the luminance value of a saturated pixel is performed.

Subsequently, the image processing unit 109 combines image data IMG1 which is obtained in S701 and in which the focus is adjusted onto the object side and the blurred image data IMG2 on the basis of the area map. An example of the combining processing of the image data will now be described. The image processing unit 109 combines the image data IMG1 in which the focus is adjusted onto the object side and the blurred image data IMG2 on the basis of $\alpha$ ($0 \leq \alpha \leq 1$) which is obtained from the pixel value of the area map and generates combined image data B. That is, the image processing unit 109 calculates each pixel B[i,j] of the combined image data B by using the following equation (1)

$$B[i,j]=IMG1[i,j]*\alpha[i,j]+IMG2[i,j]*(1-\alpha) \quad (1)$$

The combined image data B obtained by the above processing is obtained as background-shading image data. The generation processing of the background-shading image data in the present embodiment is not limited to that mentioned in the present embodiment.

For example, the background-shading image data may be obtained by executing the special filtering processing only to the background area of the image data in which the focus is adjusted onto the object side on the basis of the area map. The blurred image data IMG2 may be generated by reducing the photographed image data, enlarging the reduced image data, and returning to an original size. The blurred image data IMG2 may be also generated by applying a low-pass filter to the photographed image data. "photographed image data" mentioned here also denotes the image data photographed in S701.

By the above processing, the special image processing can be executed to the divided background areas.

The invention is not limited to those embodiments but various modifications and changes are possible within the scope of the essence of the invention. For example, photographing order of the image data in which the focus is adjusted onto the background side, the image data in which the focus is adjusted onto the object, and the image data in which the focus is adjusted onto the object side may be shuffled.

As mentioned above, in the invention, in the selection of the focus detection area serving as a background area, first, the focus detection result in which the focus is adjusted to the wide area in the image pickup plane is used as a background. Thus, even if there are a plurality of areas which can become a background in the focus detection area other than the area serving as an object, the wide area in the image pickup plane can be selected as a background and the shading processing can be performed to such an area. Therefore, the background area can be shaded with a sense that is nearly human sensibility.

If the distance difference between the area serving as an object and the background of the wide area in the image pickup plane is small, whether or not group focus detection results of the distant focus position exist is discriminated and they are selected as a background. Thus, such a situation that the erroneously focus detected result is selected as a background is prevented, and the shading processing can be performed to the image.

Although the foregoing embodiment is described on the assumption that the image in which the "background area" for the main object area is blurred is obtained, the invention can be also applied to the case of obtaining an image in which a "foreground area" for the main object area is blurred. In this case, for example, a foreground candidate area is selected in place of the background candidate area, and the image data in which the focus is adjusted onto the object area and the image data in which the focus is adjusted onto the foreground side of the nearest side are obtained. The object area and the foreground area are distinguished and the shading processing is performed to the foreground area.

By such a construction, since the area serving as a background (or foreground) in the Image pickup plane can be correctly discriminated, an image in which the background area (or foreground area) is properly blurred can be obtained.

Other Embodiments

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171255, filed Aug. 21, 2013, which is hereby incorporated by reference herein in its entirety.

What is claimed is:

1. An imaging apparatus comprising:
  a focus detection unit configured to set a plurality of focus detection areas in an image pickup plane and perform a focus detection in each of the focus detection areas;
  a selection unit configured to select a first area and a second area from among the plurality of focus detection areas based on a result of the focus detection;
  an imaging unit configured to pick up a first optical image which is formed by a photographing optical system at a first focus position at which the selected first area is in focus to generate first image data and pick up a second optical image which is formed by the photographing optical system at a second focus position at which the selected second area is in focus to generate second image data;
  a determination unit configured to determine an area to be processed based on the first image data and the second image data; and
  a processing unit configured to execute a predetermined processing to at least the first image data based on a result of the determination, wherein the selection unit selects the second area based on a number of focus detection areas in which the focus detection result satisfies a predetermined condition, from among the focus detection areas each having a depth difference from the first area in a predetermined range.

2. The imaging apparatus according to claim 1, wherein the first area is an area serving as a candidate of a main object area and the second area is an area serving as a candidate of a background area or a foreground area.

3. The imaging apparatus according to claim 1, further comprising an instruction unit configured to receive a first instruction and a second instruction for performing an image pickup of the object by the imaging unit, and
wherein the focus detection unit performs the focus detection in accordance with the first instruction, and the imaging unit generates the first image data and the second image data in accordance with the second instruction.

4. The imaging apparatus according to claim 1, wherein the selection unit selects the focus detection area in which the focus is adjusted onto an infinite side, as a first candidate of the second area in the case where the number of focus detection areas in a range of a first predetermined depth from a focus detection area in which a focus is adjusted onto the infinite side in the predetermined range of the depth difference among the focus detection areas each having the depth difference in the predetermined range is greater than a first predetermined number and is maximum and selects the focus detection area in which the focus is adjusted onto the infinite side, as a second candidate of the second area when the first candidate is not selected, in the case where a number of adjacent areas in which the result of the focus detection lies in a range of a second predetermined depth from the focus detection area in which the focus is adjusted onto the infinite side among the focus detection areas each having the depth difference in the predetermined range is equal to or greater than a second predetermined number.

5. The imaging apparatus according to claim 4, wherein the first predetermined number is greater than the second predetermined number.

6. The imaging apparatus according to claim 1, further comprising an object detection unit configured to detect an object,
wherein the selection unit sets, as the first area, a focus detection area in which a depth difference from the result of the focus detection of the focus detection area corresponding to the detected object lies in a range of a third predetermined depth.

7. The imaging apparatus according to claim 1, further comprising an object detection unit configured to detect an object,
wherein the selection unit sets a focus detection area, as the first area, which overlaps with the detected object and is adjacent in a range of a fourth predetermined depth, as the first area among the plurality of focus detection areas.

8. The imaging apparatus according to claim 1, wherein the selection unit sets a focus detection area which is adjacent in a range of a fifth predetermined depth from a focus detection area on a nearest side located near a center of the image pickup plane, as the first area among the plurality of focus detection areas.

9. The imaging apparatus according to claim 1, wherein the determination unit determines the area to be processed based on edge information in first image data and second image data, and
wherein the processing unit executes a shading processing as the predetermined processing to the determined area to be processed.

10. The imaging apparatus according to claim 1, wherein among the plurality of focus detection areas, if the focus detection areas each having the depth difference in the predetermined range from the focus detection area selected as the first area do not exist, the processing unit does not execute the predetermined processing.

11. A control method of an imaging apparatus, comprising:
setting a plurality of focus detection areas into an image pickup plane and performing a focus detection in each of the focus detection areas;
selecting a first area and a second area from among the plurality of focus detection areas based on a result of the focus detection;
picking up a first optical image which is formed by a photographing optical system at a first focus position at which the selected first area is in focus to generate first image data and picking up a second optical image which is formed by the photographing optical system at a second focus position at which the selected second area is in focus to generate second image data;
determining an area to be processed based on the first image data and the second image data; and
executing a predetermined processing to at least the first image data based on a result of the determination,
wherein the second area is selected based on the number of focus detection areas in which the focus detection result satisfies a predetermined condition, from among the focus detection areas each having a depth difference from the first area in a predetermined range.

12. A non-transitory computer-readable storage medium for causing a computer to execute a control method of an imaging apparatus, the control method comprising:
setting a plurality of focus detection areas into an image pickup plane and performing a focus detection in each of the focus detection areas;
selecting a first area and a second area from among the plurality of focus detection areas based on a result of the focus detection;
picking up a first optical image which is formed by a photographing optical system at a first focus position at which the selected first area is in focus to generate first image data and picking up a second optical image which is formed by the photographing optical system at a second focus position at which the selected second area is in focus to generate second image data;
determining an area to be processed based on the first image data and the second image data; and
executing a predetermined processing to at least the first image data based on a result of the determination,
wherein the second area is selected based on the number of focus detection areas in which the focus detection result satisfies a predetermined condition, from among the focus detection areas each having a depth difference from the first area in a predetermined range.

* * * * *